United States Patent
Sato (10) Patent No.: US 10,846,548 B2
(45) Date of Patent: Nov. 24, 2020

(54) VIDEO RECORDING APPARATUS AND METHOD THEREFOR

(71) Applicant: CANON KABUSHIKI KAISHA, Tokyo (JP)

(72) Inventor: Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/353,910

(22) Filed: Mar. 14, 2019

(65) Prior Publication Data

US 2019/0294906 A1 Sep. 26, 2019

(30) Foreign Application Priority Data

Mar. 23, 2018 (JP) .................. 2018-056092

(51) Int. Cl.
| | |
|---|---|
| *G06K 9/03* | (2006.01) |
| *G06K 9/62* | (2006.01) |
| *G06T 7/246* | (2017.01) |
| *G06K 9/00* | (2006.01) |
| *G06K 9/40* | (2006.01) |
| *H04N 5/911* | (2006.01) |
| *G06T 7/73* | (2017.01) |

(52) U.S. Cl.
CPC ......... *G06K 9/036* (2013.01); *G06K 9/00228* (2013.01); *G06K 9/00744* (2013.01); *G06K 9/40* (2013.01); *G06K 9/6202* (2013.01); *G06T 7/246* (2017.01); *G06T 7/73* (2017.01); *H04N 5/911* (2013.01); *G06T 2207/10016* (2013.01)

(58) Field of Classification Search
CPC .. H04N 5/23238; H04N 5/77; G06K 9/00369; G06K 9/00711; G06K 9/00744; G06K 2209/40; G06K 9/00268; G06T 7/20
See application file for complete search history.

(56) References Cited

U.S. PATENT DOCUMENTS

| | | | | |
|---|---|---|---|---|
| 2006/0222255 | A1* | 10/2006 | Mizuno | ................ H04N 19/645 382/240 |
| 2015/0264258 | A1* | 9/2015 | Bervoets | ................ H04N 7/181 348/36 |
| 2017/0272652 | A1* | 9/2017 | Siminoff | ............ H04N 5/23241 |

FOREIGN PATENT DOCUMENTS

JP 2010-39067 A 2/2010

* cited by examiner

*Primary Examiner* — Obafemi O Sosanya
(74) *Attorney, Agent, or Firm* — Canon U.S.A., Inc. IP Division

(57) ABSTRACT

A video recording apparatus includes an object detection unit that detects an object from an input video image; a feature amount extraction unit that extracts a feature amount of the object detected from the input video image; a correction unit that corrects the input video image; and a recording unit that, when the object is detected, records the video image corrected and the feature amount extracted in association with each other.

14 Claims, 6 Drawing Sheets

VIDEO RECORDING APPARATUS AND METHOD THEREFOR

BACKGROUND OF THE INVENTION

Field of the Invention

The present disclosure relates to a video recording apparatus and a method therefor.

Description of the Related Art

There are some recording apparatuses for monitoring camera video image that record video images captured by a monitoring camera while analyzing with a recognition technique such as detection of a person in the video image or determination of whether the person matches a person registered in advance. Such a recording apparatus for monitoring camera image has the following issues. That is, when emphasis is placed on accuracy as a video recognition technology, there is a tendency that the amount of data required increases, such that the resolution of the video image increases to obtain detailed information on the subject, the frame rate increases, or the like. On the other hand, in a recording apparatus, in order to hold a long-term video image without increasing the amount of data as much as possible, reverse measures to the foregoing ones for improving the recognition accuracy may be taken, such as reducing the resolution and image quality and recording the image at a lowered frame rate. In order to improve the recognition accuracy of video analysis without reducing the recording time, it is necessary to solve the above inconsistency.

According to Japanese Patent Laid-Open No. 2010-39067, correction of a video image is performed based on hue information of the video image to eliminate reflection of the subject and perform normal video analysis. Also, the color information of the subject is converted into color information taking reflection of the video image into consideration to perform normal video analysis.

However, according to Japanese Patent Laid-Open No. 2010-39067, an image is corrected to easily recognize a video image, but the corrected image is recorded as is. For example, in the case of recording only the frames in which motion is detected by using moving object detection in order to reduce the capacity of recording, noise reduction is performed so that moving object detection does not react to noise. For noise reduction, algorithms for smoothing in the temporal direction and the spatial direction are generally used, and detailed video information tends to be lost. This is fatal to video analysis, and in particular, when using a recognition technique that compares a person in the video image with a preregistered person, typified by face authentication, the accuracy is remarkably deteriorated. Therefore, in addition to measures for correcting the video image to improve the recognition accuracy, some measures are also required to prevent reduction in the recognition accuracy even for corrections with degradation of the video information for recording.

There is a need in the art to prevent degradation of recognition accuracy of an object in a long-time video image while recording the video image.

SUMMARY OF THE INVENTION

A video recording apparatus according to the present disclosure includes an object detection unit configured to detect an object from an input video image; a feature amount extraction unit configured to extract a feature amount of the object detected from the input video image; a correction unit configured to correct the input video image; and a recording unit configured to, when the object is detected, record the video image corrected and the feature amount extracted in association with each other.

Further features of the present disclosure will become apparent from the following description of exemplary embodiments (with reference to the attached drawings).

DESCRIPTION OF THE EMBODIMENTS

First Embodiment

Embodiments of the present disclosure will be described below in detail with reference to the accompanying drawings. In relation to the first embodiment, taking face authentication in which face information is used to determine which of preregistered persons corresponds to a person seen in the monitoring camera as a main analysis content, a method for achieving both the recording performance of a video image and the recognition accuracy will be explained.

Figure 1:
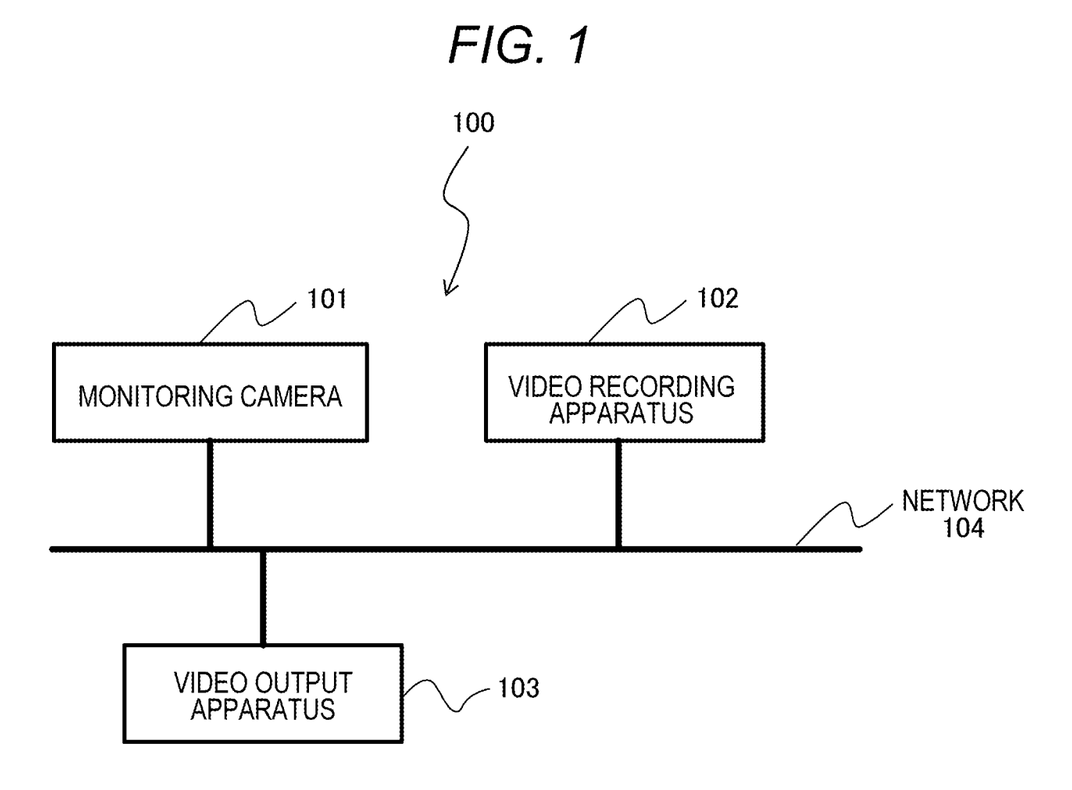
FIG. 1 is a block diagram of a monitoring camera system including a video recording apparatus.

FIG. 1 is a block diagram illustrating a configuration example of a monitoring camera system 100 according to the first embodiment. The monitoring camera system 100 includes a monitoring camera 101, a video recording apparatus 102, and a video output apparatus 103. The monitoring camera 101 is, for example, a network camera, and is connected to the video recording apparatus 102 and the video output apparatus 103 via a network 104. The monitoring camera 101 shoots a video image and transmits the shot video image to the video recording apparatus 102 and the video output apparatus 103. Note that the number of monitoring cameras 101 is not limited to one but may be plural.

The video recording apparatus 102 records the video image received from the monitoring camera 101 in a hard disk, a flash memory, or the like. Details of the configuration of the video recording apparatus 102 and processing performed therein will be described later. The video output apparatus 103 displays the video image recorded on the video recording apparatus 102 and the video image received from the monitoring camera 101. The video output apparatus 103 has, for example, a personal computer (PC), a monitor for display, a keyboard for operation, a mouse, and the like, and displays the received video image by software having a GUI.

Figure 2:
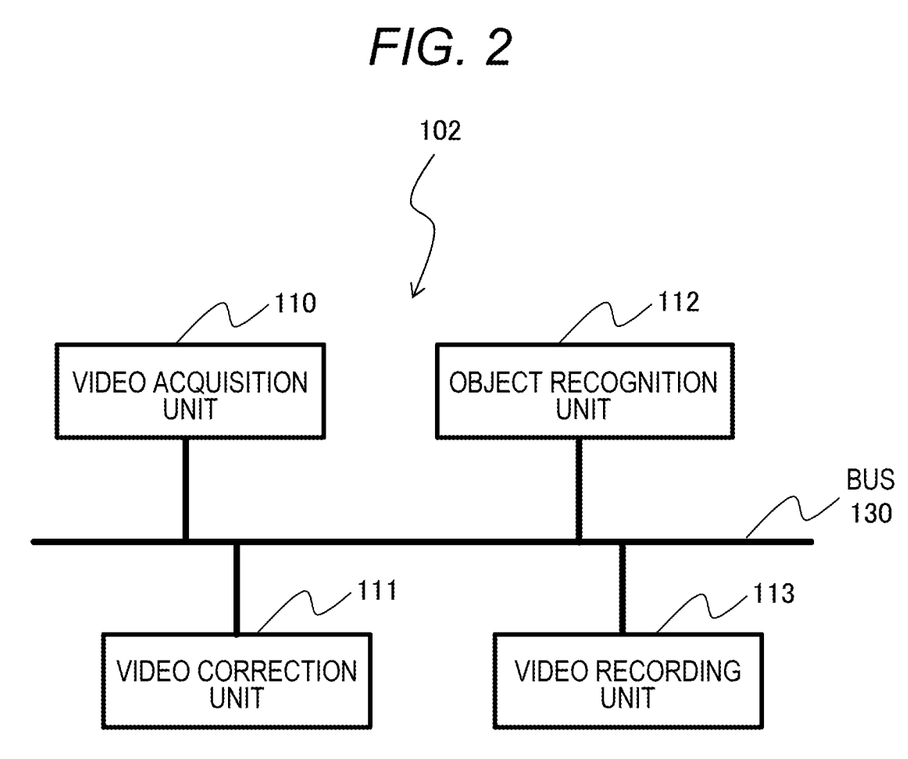
FIG. 2 is a block diagram illustrating a configuration example of the video recording apparatus.

FIG. 2 is a block diagram illustrating a configuration example of the video recording apparatus 102. The video recording apparatus 102 includes a video acquisition unit 110, a video correction unit 111, an object recognition unit 112, and a video recording unit 113. The video acquisition unit 110 acquires the video image transmitted by the monitoring camera 101. The video acquisition unit 110 may decode the moving image codec. The video correction unit 111 makes corrections to the video image acquired by the video acquisition unit 110 according to the purpose. For example, the video correction unit 111 performs noise reduction processing for removing noise in the video image, and performs brightness and color corrections.

The object recognition unit 112 recognizes an object in the video image acquired by the video acquisition unit 110. More specifically, the object recognition unit 112 performs moving object detection for detecting a portion in motion in the video image, detection of a person and the position of his/her face, and a process for determining whether the detected face matches a face registered in advance. The video recording unit 113 records the video image acquired by the video acquisition unit 110 together with information such as the recording time in a hard disk drive (HDD), a solid state drive (SSD), or the like. The video recording unit 113 also performs compression with a moving image codec. Further, the video recording unit 113 reads a video image from the HDD or SSD and transmits the video image to the video output apparatus 103. The contents of a series of processes performed by the video correction unit 111, the object recognition unit 112, and the video recording unit 113 will be described later in detail.

Figure 3:
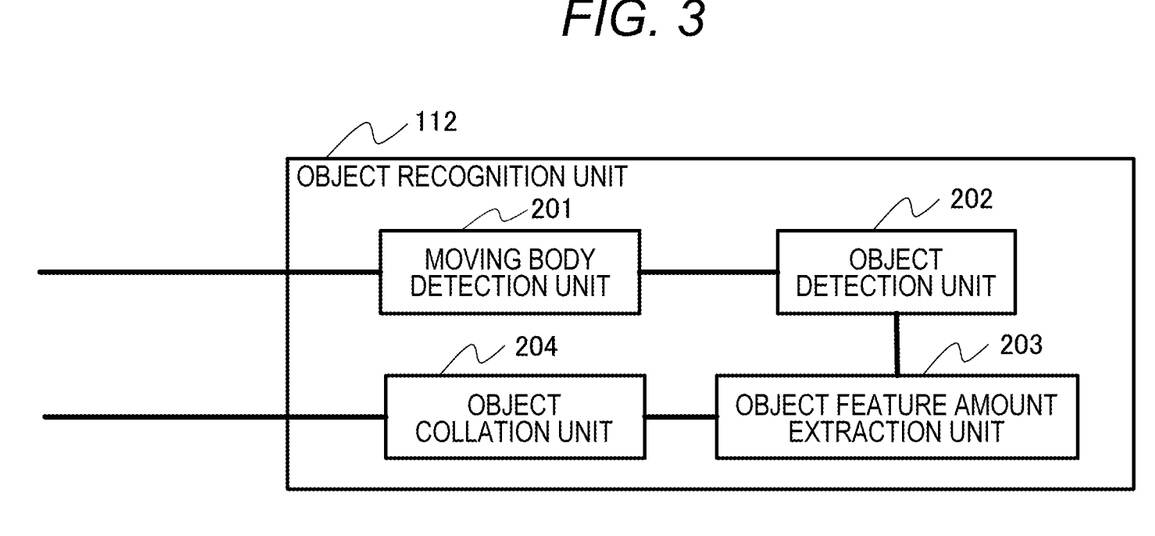
FIG. 3 is a block diagram illustrating a configuration example of an object recognition unit.

FIG. 3 is a block diagram illustrating a configuration example of the object recognition unit 112. The object recognition unit 112 includes a moving object detection unit 201, an object detection unit 202, an object feature amount extraction unit 203, and an object collation unit 204. The moving object detection unit 201 detects a moving object (a portion with motion) in the video image. This detection can be implemented using techniques such as background subtraction. The object detection unit 202 detects the positions of a human body and a face in the video image. The object detection unit 202 may detect an object other than a person such as a car or an animal. These detections can be implemented, for example, by using the technique of Deep Learning (hereinafter referred to as DL). The object detection unit 202 may detect more detailed information, for example, attribute information such as the orientation of the face, age, and sex. These detections can also be implemented by DL.

The object feature amount extraction unit 203 extracts feature amounts for discriminating individual differences among objects detected by the object detection unit 202, such as Mr. A and Mr. B in the case of persons, for example. For this extraction, local binary pattern (LBP) feature amounts can be used, for example. Alternatively, for this extraction, histogram of oriented gradient (HOG) feature amounts, scale-invariant feature transform (SIFT) feature amounts, or feature amounts obtained by mixing them may be used. In addition, the feature amounts may be extracted in a neural network. The object feature amount extraction unit 203 may subject the extracted feature amounts to dimensional reduction using a method such as principal component analysis (PCA). The object feature amount extraction unit 203 can also use the DL technique as described above.

The object collation unit 204 compares the feature amounts extracted by the object feature amount extraction unit 203 with each other and determines whether these objects are identical. For example, the object collation unit 204 treats the feature amounts as numerical sequences (feature vectors) and determines whether the objects are identical by measuring the distance between the feature vectors. Specifically, the object collation unit 204 determines that the objects are identical when the distance is smaller than a predetermined value, and does not determine that the objects are identical when the distance is larger than the predetermined value. Further, the object collation unit 204 can determine whether the objects are identical by using a machine learning technique, for example, inputting the feature vectors to a support vector machine.

Figure 4:
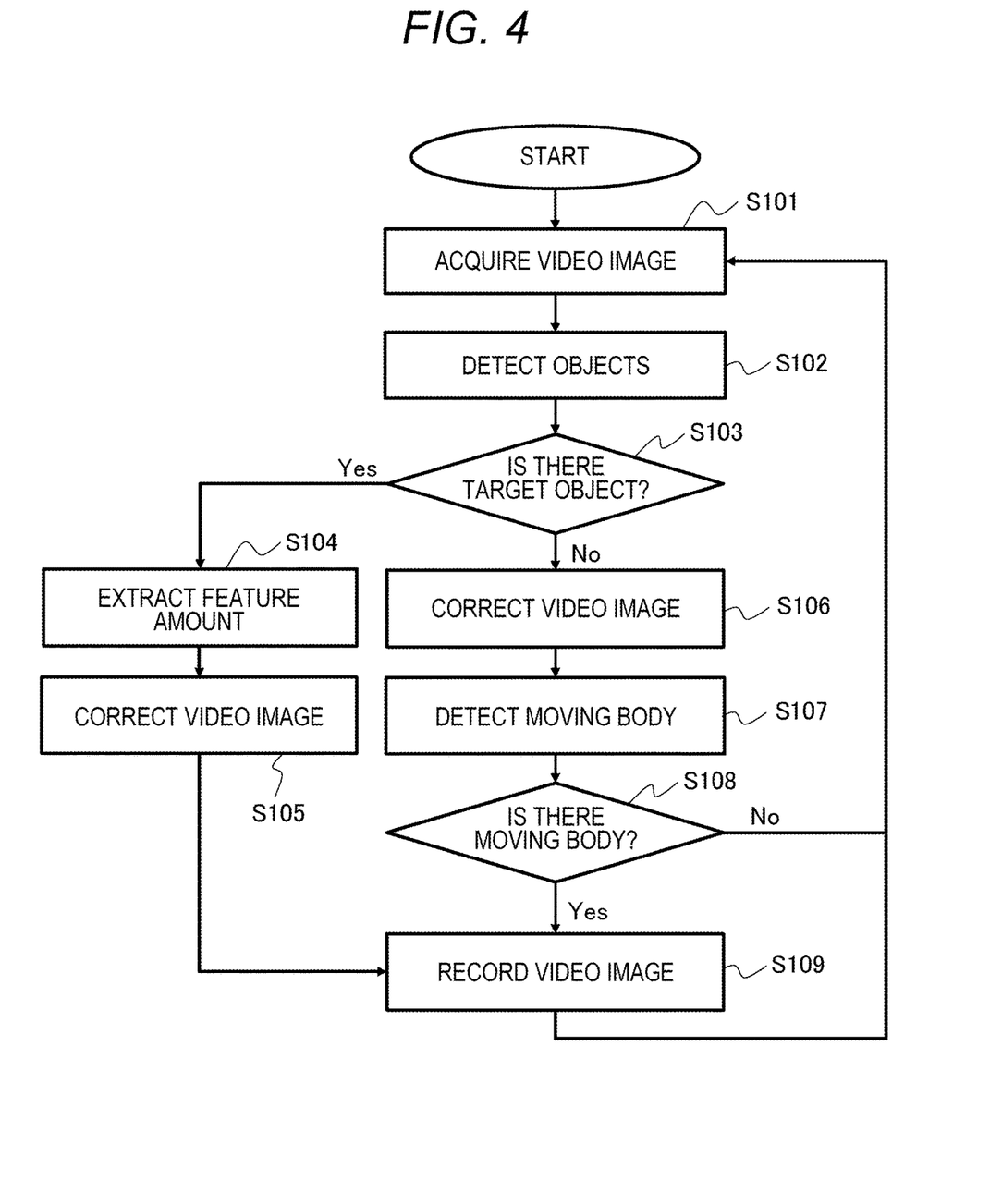
FIG. 4 is a flowchart illustrating an example of processing by the video recording apparatus.

FIG. 4 is a flowchart describing an example of a video recording method of the video recording apparatus 102. First, in step S101, the video acquisition unit 110 inputs the video image shot by the monitoring camera 101 and acquires the input video image. Next, in step S102, the object detection unit 202 detects a target object in the input video image acquired by the video acquisition unit 110. In this case, the object is, for example, the face of a person. Next, in step S103, when the object detection unit 202 detects the target object (Yes in S103), the process proceeds to step S104, and when the object detection unit 202 does not detect the target object (No in S103), the process proceeds to step S106.

In step S104, the object feature amount extraction unit 203 extracts a feature amount for discriminating the individual object detected by the object detection unit 202 from the input video image acquired by the video acquisition unit 110. Next, in step S105, the video correction unit 111 corrects the input video image acquired by the video acquisition unit 110, and the process proceeds to step S109. This correction is, for example, noise reduction processing. The meaning and effect of noise reduction will be explained later. Next, in step S109, the video recording unit 113 records the video image corrected in step S105 and the feature amount extracted in step S104 in association with each other. Thereafter, the video recording apparatus 102 returns to step S101 and repeats the processing of the video image of the next frame. After recording by the video recording unit 113, the object collation unit 204 can compare the feature amounts recorded in the video recording unit 113 with each other and determine whether these objects are identical.

In step S106, the video correction unit 111 corrects the input video image acquired by the video acquisition unit 110. The correction is, for example, noise reduction processing. Next, in step S107, the moving object detection unit 201 detects a moving object (a portion with motion) in the video image corrected by the video correction unit 111. Next, in step S108, when the moving object detection unit 201 detects a moving object (Yes in S108), the process proceeds to step S109, and when the moving object detection unit 201 detects no moving object (No in S108), the process returns to step S101 without recording in step S109. In step S109, the video recording unit 113 records the video image corrected by the video correction unit 111. Thereafter, the video recording apparatus 102 returns to step S101 and repeats the processing of the video image of the next frame. In step S109, the video recording unit 113 records the video image in a state encoded as a moving picture by the compression codec. Encoding is performed under H 264, Motion JPEG, or the like, for example.

Next, noise reduction processing performed in steps S105 and S106 will be described. Steps S105 and S106 are the same in the contents of processing but are partially different in terms of purpose. First, step S105 will be described. The noise reduction processing in step S105 is intended to reduce the data amount in the recording processing in step S109. When there is a lot of noise in a video image, the amount of useless information increases as being particularly noticeable in the case of shooting the video image in a dark place such as nighttime, and as a result, the recording time is affected. If the shutter speed is decreased to reduce noise, the blurring of the subject becomes large, and not only the value of a recorded video image but also the recognition accuracy is adversely affected in an undesirable manner. The noise reduction processing makes it possible to reduce noise and decrease the difference between frames, which works favorably for compression processing under H264 or the like.

Next, step S106 will be described. The noise reduction processing in step S106 contributes not only to reduction in the amount of data in the recording processing in step S109 but also to improvement in the accuracy of the moving object detection processing in step S107. Generally, in the moving object detection processing, a difference between frames is measured, and it is determined whether there is a motion by the magnitude of the difference. In that case, when there is a lot of noise in the video image, the noise will be detected as a difference and moving object detection will respond to this. Therefore, the number of frames to be recorded increases, which adversely affects the recording time as a result. In order to minimize this, in step S106, the video correction unit 111 performs noise reduction processing.

On the other hand, when the target object is detected in step S103, in step S104 before step S105, the object feature amount extraction unit 203 extracts the feature amount. When the video correction unit 111 performs video correction (noise reduction processing) before step S104, the details of the video image are lost to increase the possibility of the video image becoming unsuitable for feature amount extraction for individual identification. In general, in the noise reduction processing, an image is smoothed out in the spatial direction or the temporal direction. Therefore, in the case of an image of a moving subject, the image tends to be averaged with the surrounding pixels, that is, strongly blurred, and may not be suitable as an image for identifying the individual difference. In order to avoid this issue, the feature amount extraction in step S104 is performed before the noise reduction processing in step S105. According to this, the video recording apparatus 102 can maintain the recognition accuracy of the target object while preventing an increase in the burden on the video recording unit 113.

In step S109, the video recording unit 113 records the video image corrected in step S105 and the feature amount extracted in step S104 in association with each other. Associating is preferably made by the time (frame number) and the detected position of the face. In general, the feature data amount extracted by the object feature amount extraction unit 203 tends to be smaller than the data amount of the original facial image. In particular, the feature amount using the DL technique has a smaller data amount. For this reason, the amount of data can be suppressed by recording the video image in association with the feature amount rather than by recording the video image without video correction.

As described above, it is possible to prevent the video correction such as the noise reduction processing with focus on the time of video recording by the video recording unit 113 from adversely affecting on the recognition accuracy of the target object.

Step S104 may be omitted. In that case, the object feature amount extraction unit 203 does not perform feature amount extraction. In step S103, when the object detection unit 202 detects an object, the process proceeds to step S105. In step S105, the video correction unit 111 corrects the input video image acquired in step S101. Next, in step S109, based on the position and size of the object detected in step S102, the video recording unit 113 clips the target object from the input video image acquired in step S101, and normalizes the video image of the clipped object to a predetermined size. Then, the video recording unit 113 records the normalized video image of the target object and the video image corrected in step S105 in association with each other.

The video image of the target object may become larger in the amount of data than the extracted feature amount, but storing the video image of the target object has the following advantages. That is, even when the contents of the feature amount extraction processing are changed under a new algorithm, the change can be dealt with. After extracting the feature amount in step S104, when the feature amount extraction processing is changed, the extraction cannot be redone unless the original image information is held. Therefore, in order to perform the comparison by the object collation unit 204, it is necessary to perform processing before the change so that the feature amount can be compared. On the other hand, by clipping and storing the video image of the target object, it is possible to cope with the case where more accurate feature amount extraction processing is implemented after the recording in step S109. In recording the video image of the target object, the original high-resolution video image is not left but only the area of the object normalized to the predetermined size is recorded, so that the amount of data can be relatively small.

Second Embodiment

In the first embodiment, as an example, each time an object is detected in step S103, the video recording apparatus 102 performs feature amount extraction in step S104, and records the video image for recording and the feature amount in association with each other in step S109. On the other hand, the second embodiment of the present disclosure is different in the following point. That is, a video recording apparatus 102 does not extract the feature amount for the detected object in all the frames, but extracts the feature amount only when the feature amount extraction is necessary, in accordance with a predetermined criterion, and records the video image and the feature amount in association with each other.

The second embodiment will be described in detail below. In order to avoid duplication, the description of the same parts in the following second embodiment as in the first embodiment will be omitted. Therefore, the configuration of the second embodiment is the same as the configuration of the first embodiment, so the description thereof will be omitted. The second embodiment is different from the first embodiment in the configuration and processing of an object recognition unit 112. Hereinafter, the second embodiment will be described focusing on differences from the first embodiment.

Figure 5:
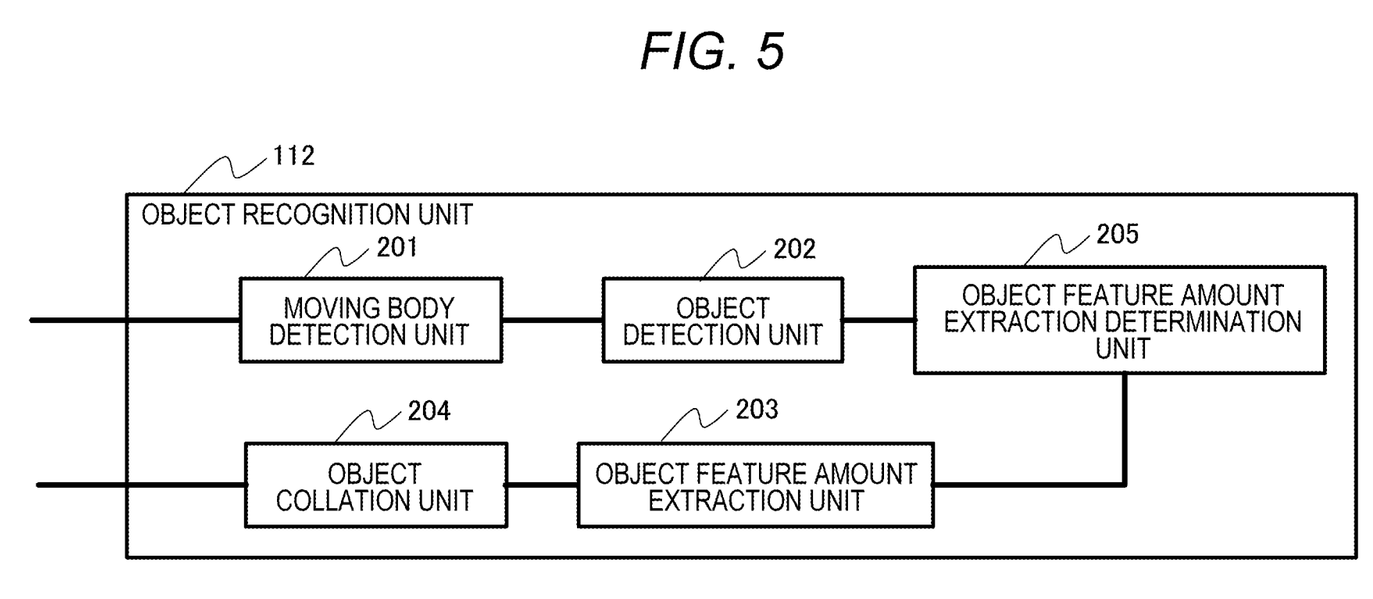
FIG. 5 is a block diagram illustrating a configuration example of the object recognition unit.

FIG. 5 is a block diagram illustrating a configuration example of the object recognition unit 112 according to the present embodiment. The object recognition unit 112 includes a moving object detection unit 201, an object detection unit 202, an object feature amount extraction unit 203, an object collation unit 204, and an object feature amount extraction determination unit 205. In the object recognition unit 112 illustrated in FIG. 5, the object feature amount extraction determination unit 205 is added to the object recognition unit 112 of FIG. 3. The processing performed by the object feature amount extraction determination unit 205 will be described later in detail.

Figure 6:
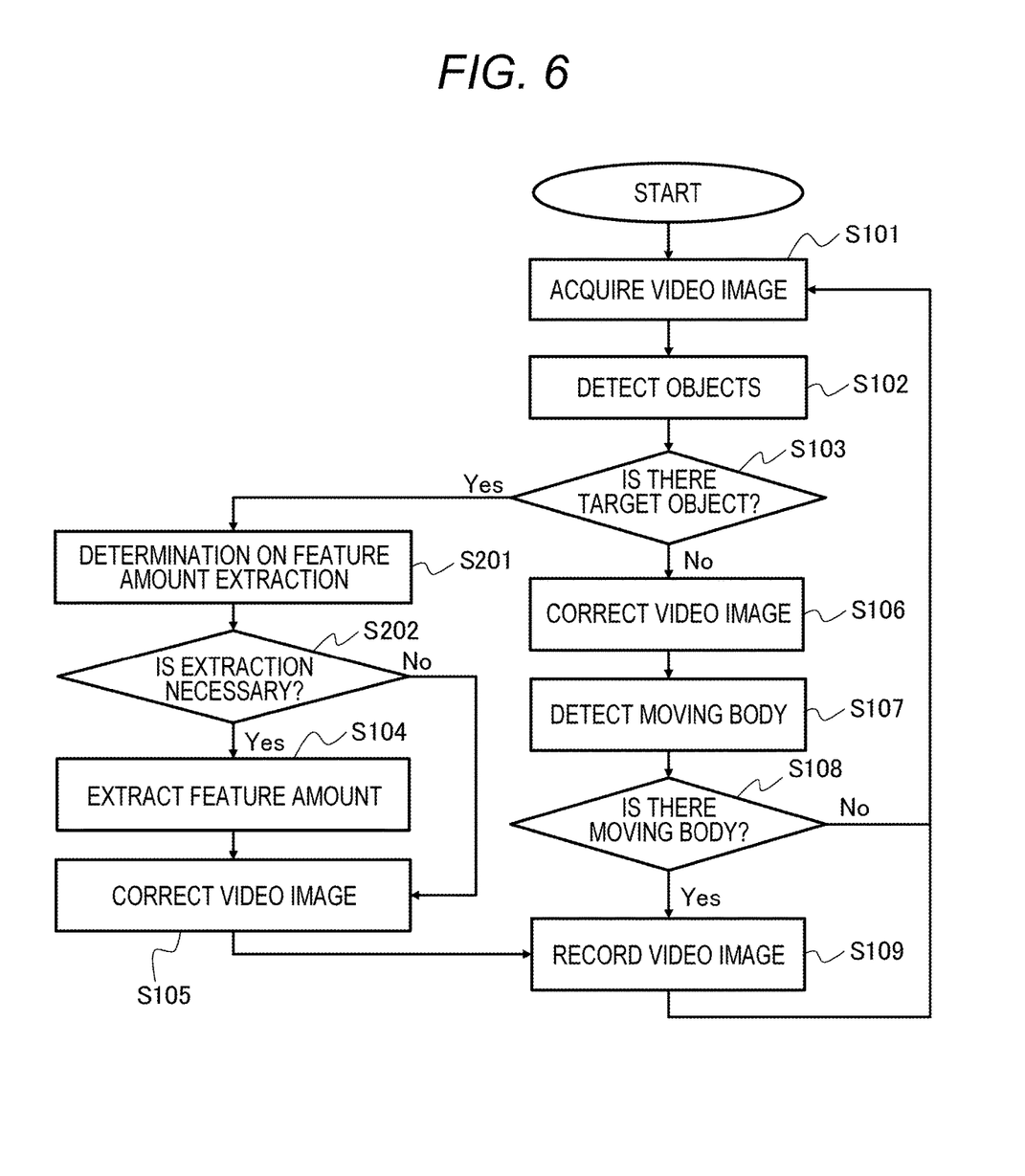
FIG. 6 is a flowchart illustrating an example of processing by the video recording apparatus.

FIG. 6 is a flowchart illustrating an example of a video recording method of the video recording apparatus 102 according to the present embodiment. In FIG. 6, steps S201 and S202 are added to the flowchart of FIG. 4. Hereinafter, the difference between FIG. 6 and FIG. 4 will be mainly described.

First, in step S101, the video acquisition unit 110 inputs the video image shot by the monitoring camera 101 and acquires the input video image. Next, in step S102, the object detection unit 202 detects a target object in the input video image acquired by the video acquisition unit 110. Next, in step S103, when the object detection unit 202 detects the target object (Yes in S103), the process proceeds to step S201, and when the object detection unit 202 does not detect the target object (No in S103), the process proceeds to step S106.

In step S201, the object feature amount extraction determination unit 205 determines whether it is necessary to extract a feature amount. Next, in step S202, when the object feature amount extraction determination unit 205 determines that it is necessary to extract a feature amount (Yes in S202), the process proceeds to step S104, and when the object feature amount extraction determination unit 205 does not determine that it is necessary to extract a feature amount (No in S202), the process proceeds to step S105.

In step S104, the object feature amount extraction unit 203 extracts a feature amount for discriminating the individual object, and the process proceeds to step S105. In step S105, the video correction unit 111 corrects the input video image acquired by the video acquisition unit 110, and the process proceeds to step S109. The other processing is the same as in the first embodiment.

Next, step S201 will be described. In step S201, the object feature amount extraction determination unit 205 determines whether, if the feature amount is extracted after correction of the video image of the target object, the target object will not be correctly recognized. In step S202, when the object feature amount extraction determination unit 205 determines that, if the feature amount is extracted from the video image after the correction, the target object will not be correctly recognized, the process proceeds to step S104. In step S104, the object feature amount extraction unit 203 extracts the feature amount of the object, and in step S105, the video correction unit 111 corrects the video image. Thereafter, in step S109, the video recording unit 113 records the video image corrected in step S105 and the feature amount extracted in step S104 in association with each other. The processing in this case is the same as in the first embodiment.

In addition, in step S202, when the object feature amount extraction determination unit 205 determines that, even if the feature amount is extracted from the corrected video image, the target object will be correctly recognized, the video recording apparatus 102 performs the video correction in step S105 without performing the feature amount extraction processing in step S104. In step S109, the video recording unit 113 records the video image corrected in step S105. According to this, it is possible to prevent unnecessary feature amounts from being recorded in association with the video image. After recording by the video recording unit 113, the object feature amount extraction unit 203 extracts the feature amounts of the objects in the video images recorded in the video recording unit 113, the object collation unit 204 compares the feature amounts of these objects to determine whether these objects are identical.

Next, details of the determination method in step S201 will be described. In step S102, the object detection unit 202 detects the object and calculates the likelihood of the detected object. In step S201, the object feature amount extraction determination unit 205 determines whether it is necessary to extract a feature amount based on the likelihood of the detected object. The relationship between the likelihood of the detected object and the feature amount for individual identification can be obtained by measuring in advance with a predetermined data set. In general, the likelihood of a detected object depends on the state of the video image or the state of the object. That is, in the case where the image quality is good or the object is in an assumed state (for a person, he/she faces the front, the front face condition is good, etc.), the likelihood of the detected object tends to be high. This is because the object detection learning data includes many video images in such a state. The feature amount for object individual identification is also based on the premise that an object has been detected, and thus uses a lot of similar learning data. That is, when the likelihood of the detected object is high, it can be said that the feature vector for individual identification is in a preferable state to increase the possibility of the object collation unit 204 performing correct collation. When the likelihood of the detected object is equal to or larger than a threshold value, the object feature amount extraction determination unit 205 determines that feature amount extraction is not necessary, and the process proceeds to step S105. The threshold value can be predetermined in advance with a predetermined data set as described above.

In step S201, the object feature amount extraction determination unit 205 may determine whether it is necessary to extract a feature amount without using the likelihood of the object obtained in step S102. In step S201, the video correction unit 111 corrects the input video image acquired by the video acquisition unit 110, and the object detection unit 202 detects the object from the corrected video image and calculates the likelihood. The object feature amount extraction determination unit 205 can use the likelihood to determine whether feature amount extraction is necessary. According to this, it is possible to more reliably determine whether feature amount extraction is necessary, taking into consideration the influence of video correction, although the processing time increases by video correction and object detection.

In step S104, similarly to the first embodiment, the object feature amount extraction unit 203 may clip the video image including the target object and generate the video image normalized to a predetermined size without extracting a feature amount. In that case, the video recording unit 113 records the video image for recording together with the video image of the target object. According to this, it is possible to deal with future updates of feature amount extraction processing.

The foregoing embodiments are merely examples for carrying out the present disclosure, and the technical scope of the present disclosure should not be interpreted restrictively by these embodiments. That is, the present disclosure can be implemented in various forms without departing from the technical idea or the main features thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-056092, filed Mar. 23, 2018, which is hereby incorporated by reference herein in its entirety.

What is claimed is:

1. A video recording apparatus comprising:
an object detection unit configured to detect an object from an input video image;
a feature amount extraction unit configured to extract a feature amount of the detected object from the input video image;
a noise reduction unit configured to reduce noise from the input video image; and
a recording unit configured to, when the object is detected, record the noise reduced video image in association with the feature amount extracted from the input video image before reducing the noise; and
a determination unit configured to, when an object is detected, determine whether to extract the feature amount,
wherein, in a case where the determination unit determines not to extract the feature amount, the recording unit records the noise reduced video image without extraction of the feature amount.

2. The video recording apparatus according to claim 1, further comprising a moving object detection unit configured to, when no object is detected, detect a moving object from the noise reduced video image, wherein
the recording unit records the noise reduced video image when no object is detected but a moving object is detected.

3. The video recording apparatus according to claim 2, wherein, when no moving object is detected, the recording unit inhibits recording of the noise reduced video image.

4. The video recording apparatus according to claim 1, further comprising a collation unit configured to compare feature amounts recorded in the recording unit for a plurality of objects to determine whether the plurality of objects is identical.

5. The video recording apparatus according to claim 4, wherein, using the feature amounts as vectors, the collation unit determines whether the plurality of objects is identical based on a distance between the vectors.

6. The image recording apparatus according to claim 1, wherein the object detection unit detects a position of an object in the input video image.

7. The video recording apparatus according to claim 6, wherein the object detection unit further detects an attribute of the object.

8. The video recording apparatus according to claim 1, wherein
when the determination unit determines to extract the feature amount, the recording unit records the noise reduced video image and the feature amount extracted in association with each other.

9. The video recording apparatus according to claim 1, wherein the determination unit determines whether, when the feature amount is extracted from the noise reduced video image, the object can be correctly recognized, and when determining that the object can be correctly recognized, the determination unit determines not to extract the feature amount.

10. The video recording apparatus according to claim 1, wherein
the object detection unit calculates a likelihood of the detected object, and
the determination unit determines whether to extract the feature amount based on the likelihood of the object.

11. The video recording apparatus according to claim 1, wherein the noise reduction unit performs noise reduction processing.

12. The video recording apparatus according to claim 1, wherein the object is a face of a person.

13. A video recording method comprising:
detecting an object from an input video image; and
when the object is detected, extracting a feature amount of the detected object from the input video image, reducing noise from the input video image, and recording the noise reduced video image in association with the feature amount extracted from the input video image before reducing the noise; and
determining, when an object is detected, determine whether to extract the feature amount,
wherein, in a case where it is determined not to extract the feature amount, recording the noise reduced video image without extraction of the feature amount.

14. A non-transitory computer-readable storage medium storing a program for causing a computer to function as:
an object detection unit configured to detect an object from an input video image;
a feature amount extraction unit configured to extract a feature amount of the detected object from the input video image;
a noise reduction unit configured to reduce noise from the input video image; and
a recording unit configured to, when the object is detected, record the noise reduced video image in association with the feature amount extracted from the input video image before reducing the noise; and
a determination unit configured to, when an object is detected, determine whether to extract the feature amount,
wherein, in a case where the determination unit determines not to extract the feature amount, the recording unit records the noise reduced video image without extraction of the feature amount.

* * * * *